United States Patent

[11] 3,627,819

[72] Inventors Robert M. Nowak;
 James T. K. Woo; Dietrich H. Heinert, all of Midland, Mich.
[21] Appl. No. 833,713
[22] Filed July 16, 1969
[45] Patented Dec. 14, 1971
[73] Assignee The Dow Chemical Company
 Midland, Mich.

[54] ADDUCTS OF ALKENYL ISOCYANATES WITH POLYGLYCOLS
 5 Claims, No Drawings
[52] U.S. Cl. .................................................... 260/482 B, 260/77.5 R, 260/77.5 AT
[51] Int. Cl. ............................................................. C07c 125/06

[50] Field of Search............................................. 260/482 B

[56] References Cited
UNITED STATES PATENTS
2,528,398  10/1950  Strain ........................... 260/482

Primary Examiner—Lorraine A. Weinberger
Assistant Examiner—Paul J. Killos
Attorneys—Griswold & Burdick, C. E. Rehberg and D. H. Thurston ABSTRACT: Vinyl isocyanate and isopropenyl isocyanate react with polyalkylene glycols such as polyethylene glycol and polypropylene glycol to form the corresponding bis(N-alkenylcarbamate) esters. These divinyl monomers are particularly useful as cross-linking agents for modifying the properties of polymers such as polyvinyl acetate.

ADDUCTS OF ALKENYL ISOCYANATES WITH POLYGLYCOLS

BACKGROUND OF THE INVENTION

This invention relates to new chemical compounds produced by the reaction of vinyl isocyanate or isopropenyl isocyanate with polyalkylene glycols. The difunctional N-alkenylcarbamic acid esters thereby provided are useful monomers and cross-linking reagents for making vinyl polymers with modified properties.

Vinyl isocyanate has been reacted in the past with diols such as ethylene glycol and other lower alkanediols. These prior art products have been polymerized by cationic catalysts or by free radical initiators such as X-rays. The N-vinylcarbamate groups in these compounds are linked by relatively small divalent radicals.

SUMMARY OF THE INVENTION

A family of new bis(N-alkenylcarbamate) esters has now been found wherein a relatively large divalent linking radical comprising multiple alkyleneoxy groups imparts different and valuable properties to these compounds. The new compounds are adducts of two molecules of vinyl isocyanate or isopropenyl isocyanate to the hydroxy groups of a molecule of polyalkylene glycol and they have the structural formula

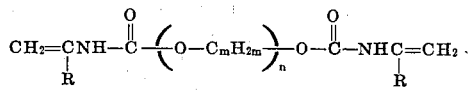

wherein R is hydrogen or a methyl radical, $m$ is two or three, and $n$ is a number from four to 100. The group $-(O-C_mH_{2m})-$ represents an alkyleneoxy group such as formed by addition of a vicinal alkylene oxide such as ethylene oxide or propylene oxide to an active hydrogen compound.

DETAILED DESCRIPTION

These new polyglycol diesters are viscous, essentially colorless oils or low-melting solids which are soluble to some extent in the common organic solvents. They are easily prepared by contacting the alkenyl isocyanate with the polyglycol at about ambient temperature. When the polyglycol is very viscous or solid, it is usually preferable to use an inert organic solvent as the reaction medium. Solvents such as tetrahydrofuran, benzene, and dimethyl sulfoxide are suitable. In some cases it is desirable to warm the reaction mixture to obtain essentially complete reaction within a relatively short time.

The ratio of reactants is not critical, but for most efficient operation, the alkenyl isocyanate is employed in at least the stoichiometric proportion, for example, 2–10 moles of isocyanate per mole of polyglycol.

It is often preferable, particularly with the higher molecular weight polyglycols, to employ a condensation catalyst such as sodium hydride or dibutyltin diacetate in order to obtain a faster rate of reaction.

The reaction product is usually most conveniently isolated from the reaction mixture by merely evaporating the solvent, if any, along with any excess of isocyanate. The crude product thereby obtained can be further purified if desired by conventional extraction or chromatographic techniques.

EXAMPLE 1

A quantity of 20 g. of polyethylene glycol of average molecular weight 400 (E-400) was stirred at room temperature while 10.4 g. of vinyl isocyanate was added dropwise. After the addition, stirring was continued for 2 hours. The unreacted excess vinyl isocyanate was stripped off under vacuum, leaving the reaction product as a viscous colorless residue. Molecular weight determination, elemental analysis, and infrared absorption examination all confirmed the identity of the product as the expected polyglycol bis(N-vinylcarbamate). Yield of the crude product was 93 percent of the theoretical quantity.

EXAMPLE 2

Using the procedure of example 1, 6.2 g. of vinyl isocyanate was reacted with 20 g. of polypropylene glycol, average molecular weight 2,000 (P-2,000), in the presence of a drop of dibutyltin dilaurate. The product obtained by evaporating off excess vinyl isocyanate was a colorless viscous oil identified as above as the expected polyglycol bis(N-vinylcarbamate). The yield was 21 g. or essentially quantitative.

EXAMPLE 3

Excess vinyl isocyanate was reacted with polyethylene glycol, average molecular weight 2,000 (E-2,000), as described in example 1 except that tetrahydrofuran was used as a reaction solvent since the polyglycol was a solid. The product was isolated and identified as previously described as the expected polyglycol bis(N-vinylcarbamate). Yield of the crude product was 84 percent of the theoretical quantity.

EXAMPLE 4

A solution of 100 g. of polypropylene glycol, average molecular weight 400 (P-400), in 100 ml. of ether was stirred at room temperature while 50 g. of vinyl isocyanate was added slowly. Stirring was continued overnight, then the ether and excess isocyanate were stripped off under reduced pressure. The residue was a slightly yellowish oil which was identified by infrared absorption spectroscopy and nuclear magnetic resonance measurements as the expected bis(N-vinylcarbamate) of the starting polyglycol. The yield was 89 percent of the theoretical amount.

In the same way as shown in the foregoing examples, isopropenyl isocyanate is reacted with the polyglycols defined above to obtain the corresponding bis(N-isopropenylcarbamates). These compounds, for example, the bis(N-isopropenylcarbamates) of E–400, P–400, E–2,000, and P–2,000, have properties closely similar to the homologous N-vinylcarbamates described above.

All of these polyglycol bis(N-alkenylcarbamates) are polymerizable by conventional methods to obtain clear rubbery polymers useful as gasketing and sealing strip materials. They are also useful cross-linking reagents and they can be copolymerized with other vinyl monomers to make resins having a wide range of properties. Such uses are illustrated in examples 5 and 6.

EXAMPLE 5

A mixture of 15 g. of vinyl acetate, 1 g. of P–400 bis(N-vinylcarbamate), and 0.1 g. of isopropyl percarbonate was sealed in a glass tube and heated at 36° C. for 18 hours. A hard solid polymer was thereby produced which was insoluble in tetrahydrofuran. The same mixture except for omitting the N-vinylcarbamate when heated in the same way produced a polyvinyl acetate which was completely soluble in tetrahydrofuran.

EXAMPLE 6

Two mixtures of 20.4 g. of P–400 bis(N-vinylcarbamate), 0.1 g. of tert-butyl perbenzoate, and 0.1 g. of tert-butyl peroctoate were heated in sealed aluminum containers at 100° C. for 5 hours. The polymerized products were clear light amber rubbery solids.

Similarly, the polyglycol bis(N-alkenylcarbamates) formed by reacting vinyl isocyanate or isopropenyl isocyanate with other polyethylene glycols or polypropylene glycols as described herein are homopolymerized or copolymerized with other vinyl monomers to obtain polymers analogous to those shown in examples 5 and 6 and having similar properties and uses.

We claim:

1. The compound of the formula

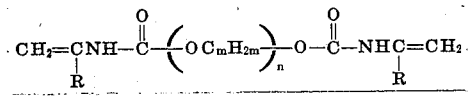
where R is hydrogen or a methyl radical, m is two or three, and n is a number from 4 to 100.
2. The compound of claim 1 wherein m is two.
3. The compound of claim 1 wherein m is three.
4. The compound of claim 2 wherein R is hydrogen.
5. The compound of claim 3 wherein R is hydrogen.